United States Patent
Lu

(10) Patent No.: US 8,363,100 B2
(45) Date of Patent: Jan. 29, 2013

(54) THREE DIMENSIONAL DISPLAY SYSTEMS AND METHODS FOR PRODUCING THREE DIMENSIONAL IMAGES

(75) Inventor: Kanghua Lu, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 973 days.

(21) Appl. No.: 12/273,983

(22) Filed: Nov. 19, 2008

(65) Prior Publication Data

US 2010/0123839 A1     May 20, 2010

(51) Int. Cl.
*H04N 7/00* (2006.01)
*H04N 7/18* (2006.01)
*H04N 13/04* (2006.01)

(52) U.S. Cl. ........................................... 348/117; 348/51
(58) Field of Classification Search .......................... None
See application file for complete search history.

(56) References Cited

U.S. PATENT DOCUMENTS

| | | | | |
|---|---|---|---|---|
| 5,976,017 | A * | 11/1999 | Omori et al. | 463/32 |
| 7,646,537 | B2 * | 1/2010 | Shestak | 359/465 |
| 7,750,982 | B2 * | 7/2010 | Nelson et al. | 349/15 |
| 2006/0286371 | A1 * | 12/2006 | Kim et al. | 428/336 |
| 2007/0035707 | A1 * | 2/2007 | Margulis | 353/122 |
| 2008/0297671 | A1 * | 12/2008 | Cha et al. | 349/15 |

* cited by examiner

*Primary Examiner* — John B. Walsh
(74) *Attorney, Agent, or Firm* — Ingrassia Fisher & Lorenz, P.C.

(57) ABSTRACT

Embodiments include aircraft systems, display systems, and methods for displaying three dimensional (3D) images. A backlight is controlled to sequentially alternate between activating a first set of light producing elements of the backlight and activating a second set of light producing elements of the backlight, where light produced by the first set of light producing elements is refracted by a lens system into a left eye viewing envelope, and light produced by the second set of light producing elements is refracted by the lens system into a right eye viewing envelope. A liquid crystal display (LCD) panel is controlled synchronously with the backlight in order to selectively pass or block portions of the light produced by the backlight in order to produce one or more left eye image frames in the left eye viewing envelope and one or more right eye image frames in the right eye viewing envelope.

18 Claims, 3 Drawing Sheets

THREE DIMENSIONAL DISPLAY SYSTEMS AND METHODS FOR PRODUCING THREE DIMENSIONAL IMAGES

TECHNICAL FIELD

The embodiments generally relate to three dimensional (3D) display systems and methods for producing 3D images on a display device.

BACKGROUND

The illusion of depth in a two dimensional image may be created by presenting a slightly different image to each eye of a viewer. When the images are properly presented, the viewer perceives a three dimensional (3D) image. Various technologies exist for conveying 3D images to a viewer, including technologies in which the viewer wears special glasses and technologies in which no special glasses are worn. For example, polarization-based 3D motion picture technologies include a projector with a polarization switching device (or two separate projectors), that projects two superimposed images onto the same screen with either orthogonal linear polarization or circular polarization of opposite handedness. The viewer wears glasses that include a pair of orthogonal linear polarizers or circular polarizers of opposite handedness, so that each eye sees only one of the images.

3D technologies also have been developed for display devices. For example, a glasses-based 3D display technology includes a display that displays left-eye and right-eye images sequentially using a concept referred to as alternate-frame sequencing. The viewer wears shutter glasses, which pass light to the left eye or to the right eye in synchronization with the images on the display screen. Other 3D display technologies exist, in which the viewer does not wear special glasses. For example, parallax-barrier type 3D display systems include one or more barrier layers that cover a liquid crystal display (LCD). The barrier layer is transparent with vertical black strips, and its horizontally, angular-dependent masking effect allows each of the viewer's eyes to see different pixel columns. Yet another 3D display technology includes overlaying an array of vertical cylindrical prisms (e.g., a lenticular lens) over an LCD. Light from some (e.g., odd) pixel columns is diverted toward the left eye, and light from other (e.g., even) pixel columns is diverted toward the right eye.

Although current 3D systems may be considered as improvements over traditional 2D systems and older 3D systems, improvements in 3D technologies are desired, particularly for 3D display devices. For example, in many situations, it is undesirable to require the viewer to wear special glasses in order to perceive 3D images. Although the parallax-barrier and lenticular lens 3D display technologies discussed above do not require the viewer to wear special glasses, both of these technologies produce images with decreased resolution when compared with glasses-based 3D technologies. The decreased resolution may cause the viewer to experience uncomfortable visual effects, headaches, and/or eye strain after relatively long viewing exposure. In addition, current 3D display systems may have certain limitations and characteristics that make them unsuitable for certain applications. For example, in avionics display devices (e.g., for cockpit display devices), it may be impractical for the flight crew to wear the glasses that are associated with glasses-based 3D display systems. In addition, avionics displays may be exposed to direct sunlight during taxi and flight, and current 3D display systems may lack sufficient sunlight readability to make them suitable for avionics applications. Accordingly, it is desirable to provide systems and methods that incorporate 3D display technologies that do not rely on the use of viewing glasses, that have improved resolution and a more comfortable viewer experience, and/or that have improved sunlight readability, among other things. Other desirable features and characteristics of the embodiments will become apparent from the subsequent detailed description of the inventive subject matter and the appended claims, taken in conjunction with the accompanying drawings and this background of the inventive subject matter.

BRIEF SUMMARY

An embodiment includes a method for displaying three dimensional (3D) images. The method comprises controlling a backlight to sequentially alternate between activating a first set of light producing elements of the backlight and activating a second set of light producing elements of the backlight, where light produced by the first set of light producing elements is refracted by a lens system into a left eye viewing envelope, and light produced by the second set of light producing elements is refracted by the lens system into a right eye viewing envelope. The method also comprises controlling a liquid crystal display (LCD) panel synchronously with the backlight in order to selectively pass or block portions of the light produced by the backlight in order to produce one or more left eye image frames in the left eye viewing envelope and one or more right eye image frames in the right eye viewing envelope.

Another embodiment includes a display system comprising a processing subsystem, a backlight, a lens system, and an LCD panel. The processing subsystem is adapted to generate a backlight control signal and an LCD control signal. The backlight comprises a plurality of light producing elements, and the backlight is adapted to receive the backlight control signal, and based on the backlight control signal, to sequentially alternate between activating a first set of light producing elements of the backlight and activating a second set of light producing elements of the backlight. The lens system is adapted to refract light produced by the first set of light producing elements into a left eye viewing envelope and to refract light produced by the second set of light producing elements into a right eye viewing envelope. The LCD panel is adapted to receive the LCD control signal, and based on the LCD control signal, to selectively pass or block portions of the light produced by the backlight in order to produce left eye image frames in the left eye viewing envelope and right eye image frames in the right eye viewing envelope in a field sequential mode to produce a 3D image.

Yet another embodiment includes an aircraft system comprising a processing subsystem and a display device. The processing subsystem is adapted to control a backlight and an LCD based on image information in order to produce 3D images. The display device has a backlight, a lens system, and an LCD panel. The backlight comprises a plurality of light producing elements, and the backlight is adapted to sequentially alternate between activating a first set of light producing elements of the backlight and activating a second set of light producing elements of the backlight. The lens system is adapted to refract light produced by the first set of light producing elements into a left eye viewing envelope and to refract light produced by the second set of light producing elements into a right eye viewing envelope. The LCD panel is adapted to selectively pass or block portions of the light produced by the backlight in order to produce left eye image frames in the left eye viewing envelope and right eye image frames in the right eye viewing envelope in a field sequential mode to produce a 3D image.

BRIEF DESCRIPTION OF THE DRAWINGS

The embodiments will hereinafter be described in conjunction with the following drawing figures, wherein like numerals denote like elements.

DETAILED DESCRIPTION

The following detailed description is merely representative in nature and is not intended to limit the inventive subject matter or the application and uses of the inventive subject matter. Furthermore, there is no intention to be bound by any theory presented in the preceding background or the following detailed description.

Embodiments include three dimensional (3D) display systems and methods for their operation. Embodiments may be implemented in various types of systems and/or apparatus, including but not limited to aircraft, motor vehicles, other types of vehicles and vessels, stand-alone display systems, display systems that are incorporated into computers (e.g., notebook, laptop, desktop or other computers), video cameras, personal digital assistants (PDAs), cellular telephones, television systems, gaming systems, other consumer electronics systems, and/or head-mounted or helmet-mounted goggle display systems, among other things.

Figure 1:
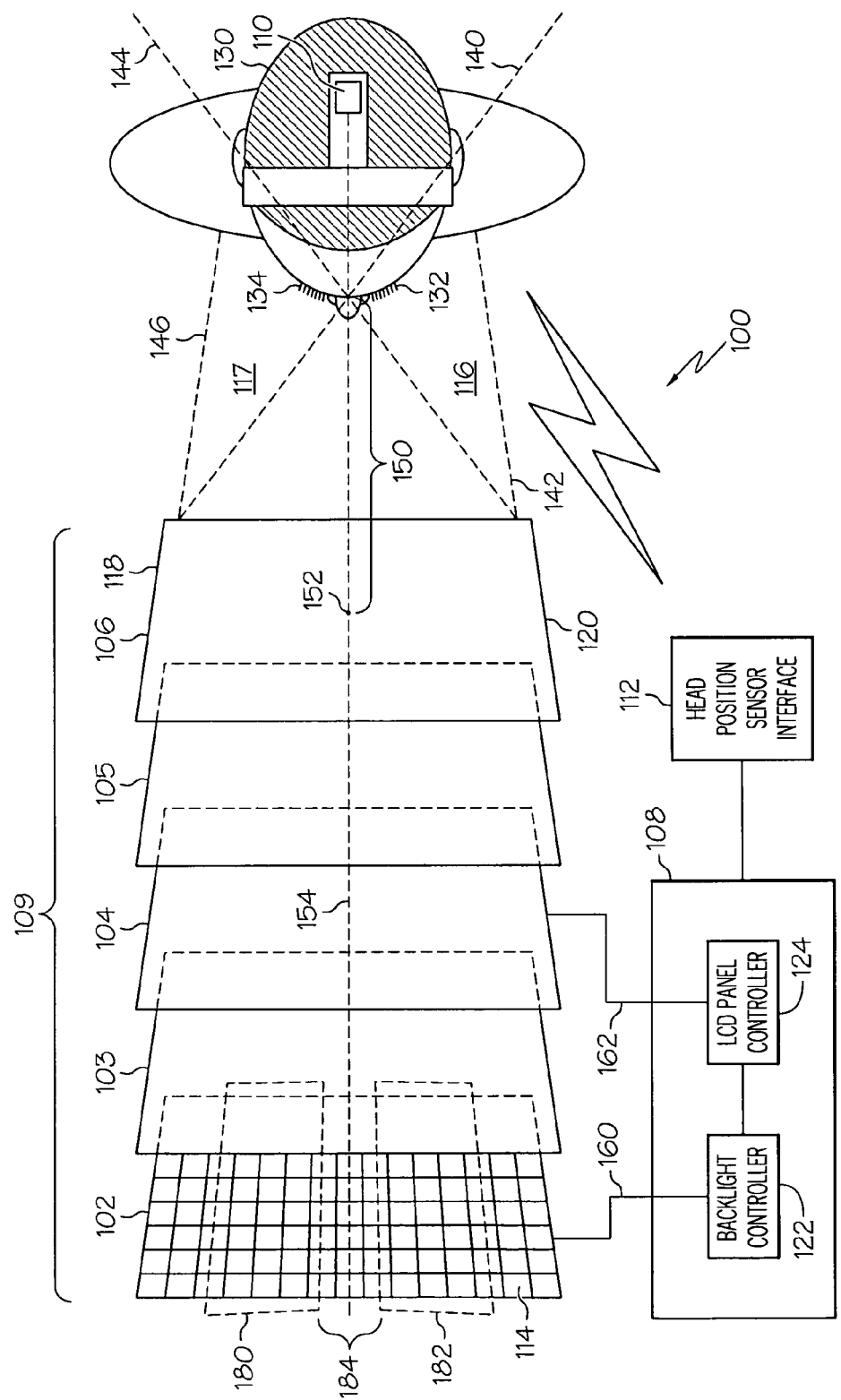
FIG. 1 is a simplified, top-down perspective and block diagram of portions of a three dimensional (3D) display system, in accordance with an example embodiment.

FIG. 1 is a simplified, top-down perspective and block diagram of portions of a three dimensional (3D) display system 100, which is being observed by one or more viewers (e.g., viewer 130), in accordance with an example embodiment. Display system 100 includes a backlight 102, a lens system 103, a liquid crystal display (LCD) panel 104, a transparent plate 105 with an anti-refraction and/or anti-glare layer 106, and a processing subsystem 108, in an embodiment. Backlight 102, lens system 103, LCD panel 104, and transparent plate 105 with anti-refraction layer and/or anti-glare 106 may be referred to collectively, below, as a display screen 109. For purposes of description and simplified illustration, backlight 102, lens system 103, LCD panel 104, transparent plate 105 with anti-refraction and/or anti-glare layer 106 are illustrated in a spatially separated configuration. In actuality, backlight 102, lens system 103, LCD panel 104, and transparent plate 105 with anti-refraction and/or anti-glare layer 106 may be positioned closely together in parallel planes or may be in direct, physical contact with each other and/or laminated together to form display screen 109. Although not specifically illustrated, according to other embodiments, display screen 109 also may include one or more other components, including but not limited to one or more diffusers (e.g., between backlight 102 and lens system 103), one or more polarizers, one or more compensation films, one or more optical filters, and/or other components.

Backlight 102 may include, for example but not by way of limitation, an m×n array of light producing elements, where m is a number of columns and n is a number of rows in the array. Backlight 102 also or alternatively could include any two-dimensional light source(s), which are adapted to provide light regionally (e.g., organic LEDs (OLEDs), cathode ray tube (CRT), etc.). For example, backlight 102 may include an array of white, color (e.g., blue, green, and red), or monochrome light emitting diodes (LEDs) 114. LEDs 114 may include, for example but not by way of limitation, inorganic LEDs, OLEDs, white light LEDs, bi-color LEDs, tricolor LEDs, RGB (red, green, blue) LEDs, and/or quantum dot LEDs. As used herein, the term "LED" is not meant to be limiting to a particular type of LED, unless that particular type is specifically indicated. According to various embodiments, backlight 102 may include at least one row and at least two columns of LEDs 114, although backlight 102 may include a large number (e.g., tens, hundreds or thousands) of rows and/or columns of LEDs, as well. In addition to the array of LEDs 114, backlight 102 may include one or more light-isolating structures (e.g., barriers between adjacent LEDs) may be used to eliminate the cross-propagating of light. Backlight 102 also or alternatively may include one or more optical layers (not illustrated) in front of the LEDs. Such optical layers may include, but are not limited to, one or more diffusers, light directing films, froesnel and/or lenticular lenses, optical filters (e.g., multi-layers or absorptive, such as a night-vision imaging system (NVIS) filter), and so on. Each LED 114 is adapted to produce light, which is generally directed toward lens system 103 and LCD panel 104. More particularly, in an embodiment, a first set of LEDs 114 (referred to herein as "left eye LEDs") may produce light that is directed through lens system 103 and LCD panel 104 and into a left eye viewing envelope 116, and a second set of LEDs (referred to herein as "right eye LEDs) 114 may produce light that is directed through lens system 103 and LCD panel 104 and into a right eye viewing envelope 117. Designation of which LEDs 114 are left eye LEDs or right eye LEDs will be discussed in more detail below. For example purposes only, the left eye LEDs may include a first set of LEDs 180 which, when illuminated, will produce light that is directed by the lens system 103 into left eye viewing envelope 116, and the right eye LEDs may include a second set of LEDs 182 which, when illuminated, will produce light that is directed by the lens system 103 into the right eye viewing envelope 117. Although certain sets of LEDs 180, 182 are indicated as left eye LEDs and right eye LEDs in FIG. 1, different sets of LEDs may be specified as left eye LEDs and right eye LEDs, and the designation of an LED as a left eye LED or a right eye LED may change over time, as viewer 130 changes his or her head position. According to an embodiment, the left eye LEDs and the right eye LEDs include mutually exclusive sets of LEDs, which sets are separated from each other in a horizontal direction. Light projected from the left eye LEDs does not overlap light projected from the right eye LEDs, and vice versa, at the positions of the right and left eyes, respectively, although there may be an overlay of light from projected from the left eye LEDs and the right eye LEDs in an area between the two eyes of 130. The two sets of LEDs also may be separated by a spacing 184 that corresponds with (e.g., is substantially equal to) the approximate eye spacing of viewer 130.

Example definitions of a left eye viewing envelope 116 and a right eye viewing envelope 117 will now be given for purposes of explanation. It is to be understood that the given definitions are not to be construed as limiting, and that other definitions of a left eye viewing envelope and right eye viewing envelope also may be applied. With a reference centerline (not illustrated) defined as a line extending from the center of the forehead of viewer 130 to the center of the chin of viewer 130, the left eye viewing envelope 116 may be defined as a portion of an area bounded on one side by a first plane (indicated by dashed line 140) that extends through the reference centerline and a first side 118 of display screen 109, and on a second side by a second plane (indicated by dashed line 142) that extends through a second side 120 of display screen 109 and continues toward and beyond the left eye 132 of viewer 130. The left eye viewing envelope 116 may encompass the left eye 132 of viewer 130 and may extend generally to the viewer's left (or to the right of the reference centerline, from the perspective of the display screen 109), as illustrated in FIG. 1. In contrast, the right eye viewing envelope 117 may be defined as a portion of an area bounded on one side by a third plane (indicated by dashed line 144) that extends through the reference centerline and the second side 120 of display screen 109, on a second side by a fourth plane (indicated by dashed line 146) that extends through the first side 118 of display screen 109 and continues toward and beyond the right eye 134 of viewer 130. The right eye viewing envelope 117 may encompass the right eye 134 of viewer 130 and may extend generally to the viewer's right (or to the left of the reference centerline, from the perspective of the display screen 109). According to one embodiment, the reference centerline may be fixed in space, and accordingly the left eye and right eye viewing envelopes also may be fixed in space. In another embodiment, the reference centerline may move according to the position and orientation of the viewer's head, and accordingly the left eye and right eye viewing envelopes also may move through selection of different sets of LEDs for the left eye and right eye viewing envelopes, as will be described in more detail below.

According to an embodiment, when a 3D image is to be displayed, backlight 102 is controlled in a field sequential mode to produce left eye and right eye images. As used herein, the term "field sequential mode" means a mode of displaying information by rapidly alternating between displaying first images intended for a first viewing envelope (e.g., left eye viewing envelope 116) and second images intended for a second and different viewing envelope (e.g., a right eye viewing envelope). More particularly, at a given frequency, (e.g., about 120 Hz), backlight 102 is controlled to alternate between displaying first images that are directed into the left eye viewing envelope, and displaying second images that are directed into the right eye viewing envelope. The alternating display process is continued for as long as the 3D image is to be displayed. When the image is dynamic (e.g., video) as opposed to static, the image is continuously updated during the display process.

In an embodiment in which the display system 100 is adapted to produce 3D images for viewing by multiple viewers, the field sequential mode control may include sequentially displaying, although not necessarily in this order, a first image intended for the left eye viewing envelopes of all viewers, and a second image intended for the right eye viewing envelopes of all viewers, and so on. Upon displaying images associated with the left and right eye viewing envelopes of all viewers, the process may repeat. As mentioned above, backlight 102 directs light generally toward lens system 103 and LCD panel 104.

Lens system 103 includes one or more lenses which occupy substantially a same planar area as backlight 102 and LCD panel 104. According to one embodiment, lens system 103 includes a single, simple lens with a single optical element. In such an embodiment, the optical properties of the lens of lens system 103 may be such that the lens will refract light originating from a first set of LEDs (e.g., left eye LEDs 180) and passing through the lens into a left eye viewing envelope (e.g., left eye viewing envelope 116), and will refract light originating from a second set of LEDs (e.g., right eye LEDs 182) and passing through the lens into a right eye viewing envelope (e.g., right eye viewing envelope 117). In alternate embodiments, lens system 103 may include a compound lens or a plurality of simple or compound lenses (e.g., two or more vertical, cylindrical prisms or a lenticular lens), where each optical element of each lens may correspond to a contiguous group of LED columns. In such embodiments, a first set of LEDs within each group may be designated as left eye LEDs, and a second set of LEDs within each group may be designated as right eye LEDs, where the first and second sets are mutually exclusive. In various alternate embodiments, one or more mirrors (e.g., flat or curved mirrors) may be included as a part of lens system 103.

LCD panel 104 may include two glass substrates, a liquid crystal between the two substrates, and a matrix of LCD elements. Controlling the current through an LCD element has the effect of altering the transparency of the LCD in proximity to the LCD element. Accordingly, such control enables light produced by backlight 102 to be selectively passed through LCD panel 104 or blocked. LCD panel 104 may form a portion of an active matrix LCD (AMLCD), according to an embodiment. In another embodiment, LCD panel 104 may be a passive matrix LCD, or displays of dynamic-transparency type. LCD panel 104 may include, for example but not by way of limitation, one or more polarizing sheets, and an x×y matrix of liquid crystal cell/thin-film transistor (TFT) pairs (each pair referred to as an "LCD element" herein), where x is a number of columns and y is a number of rows. Each LCD element forms a pixel. According to various embodiments, LCD panel 104 may include a number of rows or columns of pixels in a range of about 200 to about 2600 pixels, although LCD panel 104 may include more or fewer rows or columns of pixels than the aforementioned range, as well. The light produced by backlight 102 passes through lens system 103 and LCD panel 104, with LCD panel 104 selectively transmitting, blocking or modifying the light passing through it to display images to viewer 130.

In conjunction with a display screen housing (not illustrated) transparent plate 105 is adapted to shield the backlight 102, lens system 103, and LCD panel 104 from physical impacts, humidity and/or other potentially-damaging elements from the external environment. According to an embodiment, transparent plate 105 is configured to pass light produced by backlight 102 and affected by LCD panel 104 without producing significant optical distortion to the light. Transparent plate 105 may include, for example but not by way of limitation, glass, polymer plastics, or any other optically transparent materials. Transparent plate 105 my contain one or multiple layers, in various embodiments. These lays may include, but are not limited to, one or more transparent conductive layers (e.g. indium tin oxide (ITO) or tin-doped indium oxide), conductive mash, optical filters (e.g., multilayer and/or absorptive), adhesive layers, and/or other optical layers (e.g. diffusers, light directing films, and/or polarizers), and so on. Transparent plate 105 may be laminated onto the front surface of LCD panel 104, according to an embodiment.

Anti-refraction and/or anti-glare layer 106 is adapted to deflect light originating from the external environment (e.g., sunlight or other light sources) in a manner that has the effect of reducing the perception of glare by viewer 130 when such external light impinges upon the surface of display screen 109. According to various embodiments, anti-refraction and/or anti-glare layer 106 may include anti-refractive and/or anti-glare coating applied to the front surface of transparent plate 105 (and optionally on the rear surface of transparent plate 105), and/or an anti-refractive and/or anti-glare film or sheet overlying the surface of transparent plate 105. In an alternate embodiment, anti-refraction and/or anti-glare layer 106 may be excluded from display system 100.

Processing subsystem 108 is adapted to receive image information with which it may generate left eye and right eye image frames, and with which it may determine how to control the display screen (e.g., backlight 102 and LCD panel 104) in order to produce images. The left eye and right eye image frames may be slightly different from each other, in order to produce the illusion of depth when projected into the left eye and right eye viewing envelopes, respectively. In an embodiment, processor 108 also may cause the display screen to display two dimensional (2D) images when the information that it receives is insufficient to produce 3D images.

In a further embodiment, display system 100 includes one or more head position sensors 110 and a head position sensor interface 112. The head position sensor 110 may be worn or carried by the viewer 130, according to an embodiment. Head position sensor 110 includes one or more spatially-separated elements (e.g., coils) which communicate signals with or detect forces from other spatially-separated elements (e.g., coils) distributed in fixed locations in the environment or on display device 100. Information describing the signals or forces communicated or detected between the elements of head position sensor 110 and the other spatially-separated elements may be communicated to head position sensor interface 112 via a wired or wireless connection between head position sensor interface 112 and head position sensor 110 or the other spatially-separated elements. Head position sensor interface 112 may thereafter communicate the information or other information derived therefrom to processing subsystem 108. In an alternate embodiment, display system 100 may include a plurality of head position sensors 110, which may be worn by a plurality of viewers, and each head position sensor 110 may be adapted to communicate with the head position sensor interface 112. In an alternate embodiment, display system 100 may include a subsystem adapted to sense a viewer's head or eye position (e.g., a camera and a processing subsystem adapted to implement an optical pattern recognition algorithm for detecting possible positions of left and right eyes).

According to an embodiment, processing subsystem 108 also may receive information that indicates the position and/or orientation of the viewer's head (or the head positions and/or orientations of multiple viewers' heads), with respect to display screen 109. Processing subsystem 108 may incorporate this information into its determination of the left eye and right eye image frames and/or into its determination of which LEDs 114 will be left eye LEDs or right eye LEDs. In one embodiment, processing subsystem 108 receives head position and/or orientation information from head position sensor interface 112, which in turn receives information from head position sensor 110 indicating the viewer's head position and/or orientation. In an alternate embodiment, processing subsystem 108 may receive information indicating the position and/or orientation of the viewer's head from another type of sensor system (e.g., a system that includes a camera and executes an image processing algorithm and/or an optical pattern recognition algorithm). In yet another alternate embodiment, processing subsystem 108 may not factor head position and/or orientation information into its determination of the left eye and right eye image frames. In such an embodiment, head position sensor 110 and head position sensor interface 112 may be excluded from the system 100.

Processing subsystem 108 may be further adapted to perform the functions of a display controller. According to an embodiment, processing subsystem 108 generates backlight control signals 160 and LCD panel control signals 162 adapted to control backlight 102 and LCD panel 104, respectively. In order to generate the backlight control signals 160 and the LCD panel control signals 162, processing subsystem 108 may include, among other things, a backlight controller 122 adapted to generate the backlight control signals 160, and an LCD panel controller 124 adapted to generate the LCD panel control signals 162. Backlight controller 122 and LCD panel controller 124 may be implemented in hardware and/or software. Backlight control signals 160 may include information that identifies sets of LEDs, which in turn causes backlight 102 to activate or deactivate various ones of LEDs 114. More particularly, backlight control signals 160 may include information that causes backlight 102 sequentially and repeatedly to activate a first set of LEDs 114 associated with a left eye viewing envelope (i.e., the left eye LEDs 180) and a second set of LEDs 114 associated with a right eye viewing envelope (i.e., the right eye LEDs 182) in order to produce left eye and right eye images in a field sequential mode. When LEDs 114 are color LEDs (e.g., each LED has red, green, and blue sub-pixels), backlight control signals may further cause each active LED 114 to produce a particular color. LCD panel control signals 162 include information that causes selected ones of the LCDs within LCD panel 104 to conduct or block current, which in turn causes associated liquid crystal cells to become opaque (thus blocking light from backlight 102), semi-transparent or transparent (thus allowing light from backlight 102 to pass through). According to an embodiment, processing subsystem 108 also may provide a synchronizing signal (not illustrated), that enables backlight 102 and LCD panel 104 to operate in a synchronous manner, as described in more detail below.

Figure 2:
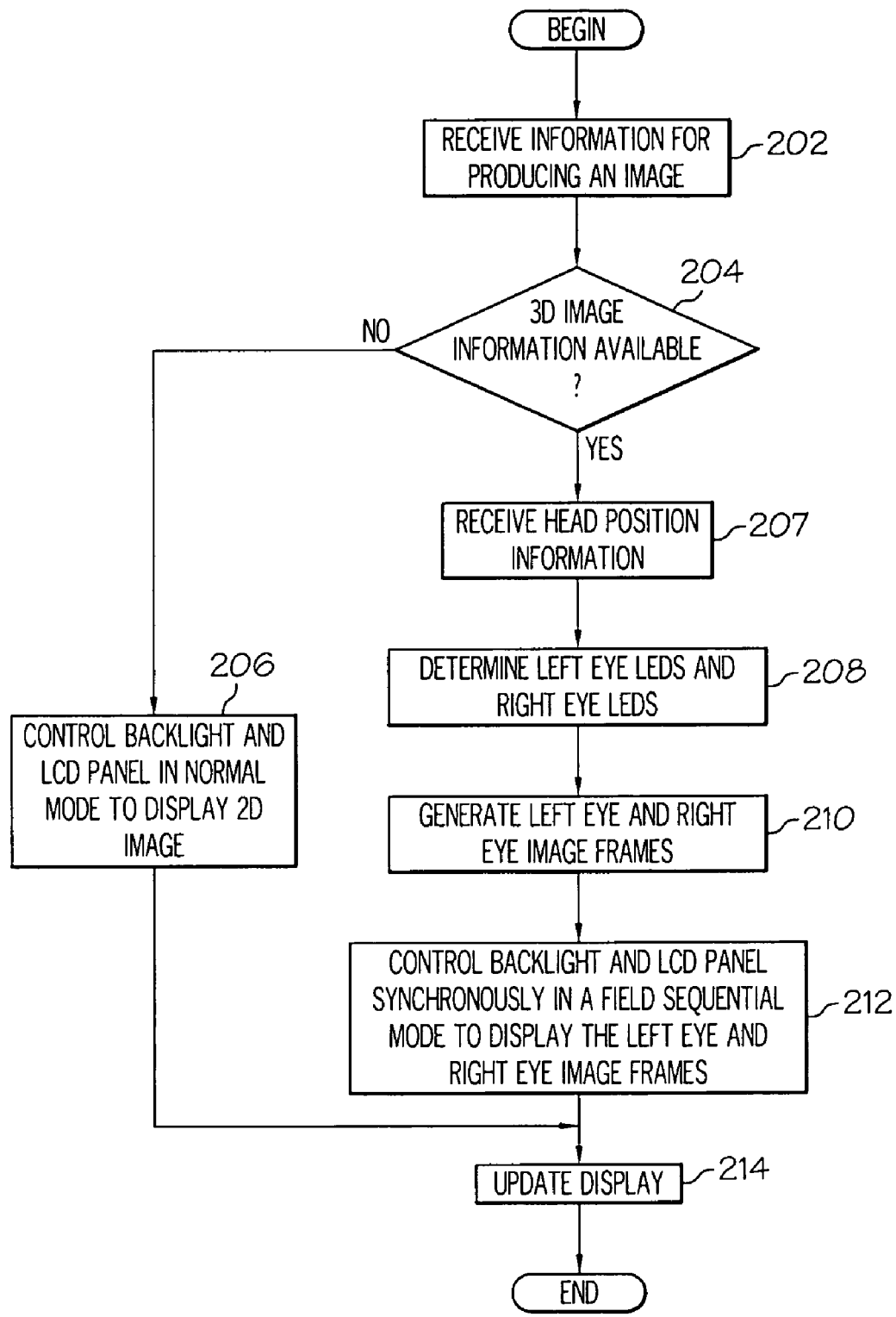
FIG. 2 is a flowchart of a method for displaying a 3D image, in accordance with an example embodiment.
Figure 3:
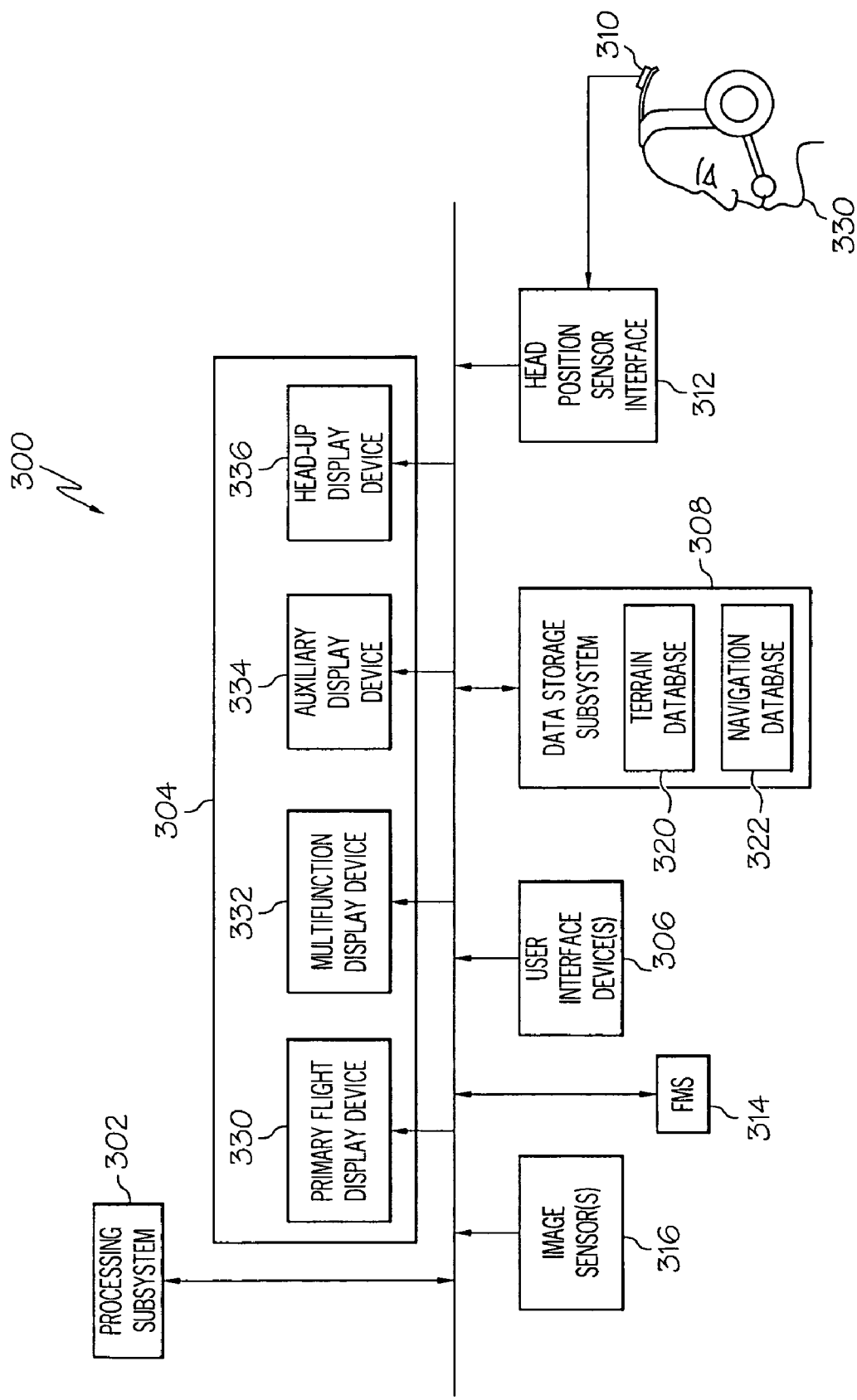
FIG. 3 is a simplified block diagram of an aircraft system within which a 3D display system may be incorporated, in accordance with an example embodiment.

The system 100 of FIG. 1 may be operated in order to display images that may be perceived by viewer 130 as 3D images. FIG. 2 is a flowchart of a method for displaying a 3D image, in accordance with an example embodiment. Embodiments of the method may be implemented on system such as the systems depicted in FIG. 1 or FIG. 3, although the method embodiments may be implemented in systems that are differently configured, as well. According to a particular embodiment, computational portions of the method may be performed by a processing system, such as processing subsystem 108 (FIG. 1) or processing subsystem 302 (FIG. 3).

The method may begin, in block 202, by receiving (e.g., by processing subsystem 108, FIG. 1 or processing subsystem 302, FIG. 3) information that may be processed in order to produce an image on a display screen. This information may include image information, for example. Image information may be received from one or more of a variety of different sources. For example, in a system that includes one or more image sensors (e.g., cameras or other image sensors), the image information may include sensed image data produced by the image sensor(s). In addition or alternatively, image information may include synthetic image data (e.g., data defining a synthetic depiction of terrain or some other object) and/or data that otherwise enables a synthetic image to be produced. In addition to image information, other information may be received that may be processed in order to produce an image on a display screen. For example, information regarding head position and/or orientation may be received (e.g., from head position sensor 110 and head position sensor interface 112, FIG. 1). As will be described below, this information may be useful for defining the left eye and right eye viewing envelopes.

According to an embodiment, a display system may be adapted to display both 2D and 3D images, and accordingly the received image information may include information for producing a 2D image or a 3D image. In an alternate embodiment, the display system may be adapted to display only 3D images. When the display system is adapted to display both 2D and 3D images, then in block 204, a determination may be made whether the image information received in block 202 is sufficient to produce a 3D image (e.g., whether the image information includes information that is sufficient to produce one or more left eye image frames and right eye image frames), as opposed to having available information that is sufficient only to produce a 2D image. For example, when the system includes two spatially-separated image sensors, each image sensor may produce sensed image data that may be used to generate left eye image frames or right eye image frames. Alternatively, for example, synthetic image information may be available that represents terrain or other objects from at least two viewing perspectives. When the information is not available for producing a 3D image, then the backlight (e.g., backlight 102, FIG. 1) and the LCD panel (e.g., LCD panel 104, FIG. 1) are controlled in a normal mode (e.g., not in a field sequential mode) in order to display a 2D image, in block 206, and the method then proceeds to block 214, which will be described later.

In block 207, head position and/or orientation information may be received. For example, as discussed previously, head position and/or orientation information may be determined using one or more head position sensors (e.g., head position sensors 110, FIG. 1) and a head position sensor interface (e.g., head position sensor interface 112, FIG. 1) or using other types of systems. In an alternate embodiment, head position and/or orientation information may not be received.

In block 208, a determination may be made regarding which LEDs (e.g., LEDs 114, FIG. 1) will be designated to the left eye viewing envelope (e.g., left eye LEDs), and which other LEDs will be designated to the right eye viewing envelope (e.g., right eye LEDs). Referring also to FIG. 1, a determination of the left eye LEDs and the right eye LEDs may be made, for example, based on knowledge of an approximate distance (e.g., distance 150, FIG. 1) of a viewer's eyes from the display screen (e.g., a center point 152 or vertical center line of a surface of the display screen 109, FIG. 1), and/or how far the viewer's head is positioned to the left or right (e.g., from the perspective of display screen 109) of a horizontal center line (e.g., center line 154, FIG. 1) or center plane of the display screen. Approximate, real-time values for the distance of the viewer's head from the display screen and the position of the viewer's head with respect to the horizontal center line are obtained using the head position and/or orientation information received in block 207 from a head position sensor and head position sensor interface, according to an embodiment. In addition, the determination of the left eye LEDs and the right eye LEDs may be based on an approximate spacing between the viewer's eyes. According to an embodiment, the eye spacing may be a pre-set value in a range of about 4 centimeters (cm) to about 8 cm. According to another embodiment, the eye spacing may be determined for each user using, for example, a subsystem adapted to sense the positions of both of the viewer's eyes (e.g., a camera and a processing subsystem adapted to implement an optical pattern recognition algorithm for detecting possible positions of left and right eyes), and to determine the distance between the eyes based on the sensed information.

According to an embodiment, in a system in which the LEDs are arranged in an array (e.g., an m×n array of LEDs, where m is a number of columns and n is a number of rows), the left eye LEDs may be determined as a set of LEDs (e.g., left eye LEDs 180, FIG. 1) which, when illuminated, will produce light that is refracted by the lens system (e.g., lens system 103, FIG. 1) into a left eye viewing envelope (e.g., left eye viewing envelope 116, FIG. 1), where the left eye viewing envelope may be determined based on information describing the viewer's head position, as specified above. Similarly, the right eye LEDs may be determined as a set of LEDs (e.g., right eye LEDs 182, FIG. 1) which, when illuminated, will produce light that is refracted by the lens system into a right eye viewing envelope (e.g., right eye viewing envelope 117, FIG. 1), where the right eye viewing envelope also may be determined based on the information describing the viewer's head position. Accordingly, determination of the left eye LEDs and the right eye LEDs also takes into account the optical properties of the lens system (e.g., lens system 103, FIG. 1). According to an embodiment, the left eye LEDs and the right eye LEDs include mutually exclusive sets of LEDs, which sets are separated from each other in a horizontal direction by a spacing (e.g., spacing 184, FIG. 1) that corresponds with (e.g., is substantially equal to) the approximate eye spacing of the viewer.

According to an embodiment, the height of the viewer's head is not factored into the determination of left eye LEDs and right eye LEDs. In an alternate embodiment, however, the viewer's head height may be factored into the determination. In yet another alternate embodiment (e.g., when head position and/or orientation information is not available), the left eye LEDs and the right eye LEDs may be designated to include pre-determined and unchanging sets of LEDs. Accordingly, in such an embodiment, this determination may be excluded from the method.

In block 210, the image information may be used to generate one or more left eye image frames and right eye image frames. Then, in block 212, the backlight (e.g., backlight 102, FIG. 1) and the LCD panel (e.g., LCD panel 106, FIG. 1) are controlled synchronously in a field sequential mode in order sequentially to display the left eye image frames that will be directed (e.g., by lens system 103, FIG. 1) into the left eye viewing envelope (e.g., using the left eye LEDs) and the right eye image frames into the right eye viewing envelope (e.g., using the right eye LEDs). In an embodiment, when the left eye LEDs are illuminated (e.g., a left eye image frame is being displayed), the right eye LEDs are deactivated, and vice versa. More specifically, sequentially displaying the left eye and right eye image frames may include performing (and repeating) a process of activating the left eye LEDs in order to display a left eye image frame directed into the left eye viewing envelope, deactivating the left eye LEDs, activating the right eye LEDs in order to display a right eye image frame directed into the right eye viewing envelope, and deactivating the right eye LEDs.

The frequency for sequentially displaying the left eye image frames and the right eye image frames may be in a range of not less than about 90 Hz, in an embodiment, with a frequency of about 120 Hz being preferred. In alternate embodiments, the frequency for sequentially displaying the left eye and right eye image frames may be higher or lower than the aforementioned range. For example, at a frequency of 120 Hz, a first image (e.g., a left eye image frame) may be displayed for a duration of about 8.33 milliseconds (ms), then a second image (e.g., a right eye image frame) may be displayed for the next 8.33 ms, and the alternation between displaying left eye and right eye image frames may thereafter repeat. The rate at which the left eye LEDs and the right eye LEDs are synchronously activated and deactivated may correspond with the refresh rate of the LCD panel, according to an embodiment. In a particular embodiment, the refresh rate of the LCD panel is about twice the frequency at which the backlight alternates for left eye image frames or right eye image frames. For example, when the frequency at which the backlight alternates between displaying left eye image frames or right eye image frames is about 60 Hz, the refresh rate of the LCD panel may be about 120 Hz. According to an embodiment, a first refresh cycle may be timed to complete at approximately the same time as the time when left eye LEDs are activated (and right eye LEDs are deactivated), and a second refresh cycle may be timed to complete at approximately the same time as the time when right eye LEDs are activated (and left eye LEDs are deactivated), and so on. According to another embodiment, the first and second refresh cycles may be timed to complete a period of time before activation of the left eye LEDs or the right eye LEDs, where the period of time is some fraction of the duration of the refresh cycle. The illumination provided by the left eye LEDs and the right eye LEDs may occur for substantially the entire duration of a refresh cycle or for only a portion of the refresh cycle, according to various embodiments.

In block 214, the system continues to update the display by generating new display signals (e.g., and repeating blocks 202-212). For dynamic images (e.g., video), the updated display signals may be based on new image information. In addition, the system continues to update the LED designations for the left eye viewing envelope and the right eye viewing envelope as new or updated head position and/or orientation information becomes available, if it is provided at all. Eventually, such as when displaying 3D images is no longer desired or when the system is powered down, the method may end.

As mentioned previously, a display system (e.g., system 100, FIG. 1) may be adapted to produce 3D images for multiple viewers, according to an embodiment. In such an embodiment, blocks 207, 208, and 210 may be performed for each viewer, and the synchronous control of the LED panel and backlight in block 212 may include sequentially displaying left eye image frames and right eye image frames for each viewer. Although not described in detail herein, the inventive subject matter includes embodiments adapted to produce 3D images for a single viewer and for multiple viewers.

FIG. 3 is a simplified block diagram of an aircraft system 300 within which a 3D display system may be incorporated, in accordance with an example embodiment. System 300 includes a processing subsystem 302, one or more display devices 304, one or more user interface devices 306, and a data storage subsystem 308, according to an embodiment. System 300 also may include a head position sensor 310 and a head position sensor interface 312. In a particular embodiment, system 300 is implemented in an aircraft, and system 300 further includes a flight management system 314 (FMS). System 300 also may include one or more image sensors 316 (e.g., visible radiation sensing cameras (e.g., still cameras or video cameras), electro-optical devices, infrared radiation sensors (e.g., night vision sensors), ultraviolet light sensors, light detection and ranging (LIDAR) devices, and radar devices (e.g., millimeter wave radar, microwave radar, and/or radio frequency wave radar), to name a few), which may provide sensed image data that processing subsystem 302 may use to produce left eye and right eye image frames.

The various components of system 300 may be communicatively coupled via one or more communication busses as illustrated, in an embodiment, in order to exchange information between the various components. In alternate embodiments, the various components of system 300 may be communicatively coupled using different arrangements from that depicted in FIG. 3. Processing subsystem 302 and display devices 304 may be co-located (e.g., within an aircraft). In other embodiments, processing subsystem 302 and display devices 304 may be remotely located from each other. Accordingly, system 300 may include various communication apparatus (not illustrated) adapted to facilitate communication of data between processing subsystem 302 and display devices 304.

Processing subsystem 302 includes one or more co-located or communicatively coupled general purpose or special purpose microprocessors and associated memory devices and other electronic components, in an embodiment. Processing subsystem 302 is adapted to receive image information, which includes information representing actual or synthetic 3D images. The image information may include, for example, sensed image information (e.g., from image sensors), still images, and/or video, according to an embodiment. In addition or alternatively, the image information may include information that enables the generation of synthetic images of an object or of an environment, one or more instrumentation indicators (e.g., attitude indicator, altitude indicator, heading indicator, airspeed indicator, glideslope scale), and/or one or more symbols (e.g., a flight path vector symbol, target symbol, waypoint symbol, obstacle symbol, runway symbol, extended runway centerline symbol, attitude indicator symbol, and/or zero pitch reference line or horizon line). The information that enables the generation of the synthetic images may include flight management information (e.g., from FMS 314), navigation and control information (e.g., from the navigation system of FMS 314), and/or terrain information (e.g., from data storage subsystem 308), for example.

Processing subsystem 302 also may be adapted to receive head position and/or orientation information from head position sensor 310 and head position sensor interface 312. In an embodiment, head position sensor 310 may be connected to a support member, which is adapted to be worn on the head of viewer 330. Alternatively, a head position sensor 310 may be carried on a helmet or other headgear. Head position sensor 310 includes one or more spatially-separated elements (e.g., coils) which communicate signals with or detect forces from other spatially-separated elements (e.g., coils) distributed in fixed locations in the environment (e.g., within the cockpit) or on a display device 304. Information describing the signals or forces communicated or detected between the elements of head position sensor 310 and the other spatially-separated elements may be communicated to head position sensor interface 312 via a wired or wireless connection between head position sensor interface 312 and head position sensor 310 or the other spatially-separated elements. Head position sensor interface 312 may thereafter communicate the information or other information derived therefrom to processing subsystem 302. According to an embodiment, processing subsystem 302 may use the head position and/or orientation information to implement a method for displaying 3D images, as described in detail above.

Data storage subsystem 308 includes one or more memory devices (e.g., random access memory (RAM), read only memory (ROM), removable data storage media and associated interfaces, and/or other types of memory devices. In an embodiment, data storage subsystem 308 includes a terrain database 320 and a navigation database 322, among other things. The terrain database 320 may include locations and elevations of natural terrain features and obstacles (e.g., mountains or other earth surface features) and man-made obstacles (e.g., radio antenna towers, buildings, bridges). Terrain data stored in terrain database 320 may be received from external, up-linked sources and/or from onboard devices (e.g., a Forward Looking Infrared (FLIR) sensor and/or active or passive type radar devices) that sense and map man-made obstacles. The navigation database 322 may include, for example, data defining the actual geographical boundaries of airports, runways, taxiways, airspaces, and geographic regions, among other things.

Display devices 304 may form a portion of an electronic flight instrument system (EFIS). According to an embodiment, processing subsystem 102 includes a display controller for each of display devices 304. Alternatively, each of display devices 304 may include a display controller. One or more of display devices 304 also may include a backlight (e.g., backlight 102, FIG. 1), a lens system (e.g., lens system 103, FIG. 1), an LCD panel (e.g., LCD panel 104, FIG. 1), a transparent plate (e.g., transparent plate 105, FIG. 1), and an anti-refraction layer (e.g., anti-refraction and/or anti-glare layer 106, FIG. 1), which together form a display screen that is adapted to present 3D images for visual perception by viewer 330. More particularly, one or more of display devices 304 may be adapted to display any one or more types of 3D images selected from a group of images that includes, but is not limited to, sensor-based images and/or synthetic images (e.g., of terrain or other objects), instrumentation indicators, and/or symbols. In an aircraft embodiment, display devices 304 may include one or more display devices selected from a group of display devices that includes a primary flight display device 330, a multi-function display device 332, an auxiliary display device 334, a head-up display device 336, and a near-to-eye display device (not illustrated). In other embodiments, other types of display devices 304 may be included within system 300.

FMS 314 is a computerized avionics component adapted to provide real-time lateral navigation information and to calculate performance data and predicted vertical profiles, among other functions. FMS 314 may include, for example, a flight management computer, an autopilot or auto flight system, and a navigation system. The navigation system may, in turn, include a Global Positioning System (GPS) receiver and an inertial reference system (IRS) or attitude heading and reference system (AHRS), which enable the navigation system to determine the aircraft's current position, attitude, and heading.

User interface devices 306 may include, for example, one or more keyboards, cursor control devices, touchscreens associated with one or more of display devices 304, and/or other types of user interface devices. According to an embodiment, user interface devices 306 may enable a user to cause the system to alternate between displaying 2D or 3D images, and/or may enable the user to manipulate a perceived viewing direction of a 3D image (e.g., to rotate an object represented in a 3D image).

Embodiments of 3D display systems and methods for their operation have now been described. Implementations of such systems and methods may provide one or more advantages over other 3D display systems and methods. For example, embodiments of the 3D display systems and methods described above do not rely on the use of viewing glasses, may have improved resolution and a more comfortable viewer experience, and/or may have improved sunlight readability, among other advantages.

The various embodiments described above have been described herein in terms of functional block components and various processing steps. It should be appreciated that such functional blocks may be realized by any number of hardware, firmware, and/or software components configured to perform the specified functions. While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the embodiments in any way. Rather, the foregoing detailed description will provide those skilled in the art with a convenient road map for implementing an exemplary embodiment. It being understood that various changes may be made in the function and arrangement of elements described in an exemplary embodiment without departing from the scope of the inventive subject matter as set forth in the appended claims.

What is claimed is:

1. A method for displaying three dimensional (3D) images, the method comprising the steps of:
   selectively determining a left eye viewing envelope and a right eye viewing envelope;
   selectively determining a first set of light emitting diodes and a second set light emitting diodes from a plurality of light emitting diodes based on the left eye viewing envelope and the right eye viewing envelope;
   controlling a backlight to sequentially alternate between activating the first set of light emitting diodes of the backlight and activating a second set of light emitting diodes of the backlight based on the left eye viewing envelope and the right eye viewing envelope; and
   controlling a liquid crystal display (LCD) panel synchronously with the backlight in order to selectively pass or block portions of the light produced by the backlight in order to produce one or more left eye image frames in the left eye viewing envelope and one or more right eye image frames in the right eye viewing envelope.

2. The method of claim 1, further comprising:
   receiving image information;
   wherein controlling the backlight comprises:
      generating, based on the image information, backlight control signals that include information that causes the backlight sequentially and repeatedly to activate the first set of light producing elements and the second set of light producing elements in order to produce light in the left eye viewing envelope and in the right eye viewing envelope in a field sequential mode; and
   wherein controlling the LCD panel comprises:
      generating, based on the image information, LCD panel control signals that include information that causes selected LCDs within the LCD panel to conduct or block current, which in turn causes associated liquid crystal cells to become opaque, semi-transparent or transparent in order to produce the one or more left eye image frames and the one or more right eye image frames in the field sequential mode.

3. The method of claim 1, further comprising:
   receiving head position information;
   determining the first set of light producing elements based on the head position information; and
   determining the second set of light producing elements based on the head position information.

4. The method of claim 1, further comprising the steps of:
   receiving image information;
   determining whether the image information is insufficient to generate a 3D image; and
   when the image information is insufficient to generate the 3D image, controlling the backlight and the LCD panel to display a two dimensional (2D) image.

5. A display system comprising:
   a processing subsystem adapted to selectively determine a left eye viewing envelope and a right eye viewing envelope, to selectively determine a first set of light emitting diodes and a second set light emitting diodes based on the left eye viewing envelope and the right eye viewing envelope, and to generate a backlight control signal and a liquid crystal display (LCD) control signal based on the left eye viewing envelope and the right eye viewing envelope;

a backlight comprising a plurality of light emitting diodes, wherein the backlight is adapted to receive the backlight control signal, and based on the backlight control signal, to sequentially alternate between activating the first set of light emitting diodes of the backlight and activating the second set of light emitting diodes of the backlight based on the left eye viewing envelope and the right eye viewing envelope;

a lens system adapted to refract light produced by the first set of light producing elements into the left eye viewing envelope and to refract light produced by the second set of light producing elements into the right eye viewing envelope; and an LCD panel adapted to receive the LCD control signal, and based on the LCD control signal, to selectively pass or block portions of the light produced by the backlight in order to produce left eye image frames in the left eye viewing envelope and right eye image frames in the right eye viewing envelope in a field sequential mode to produce a three dimensional (3D) image.

6. The display system of claim 5, wherein the system is adapted to be incorporated into an apparatus selected from a group of apparatus that includes an aircraft, a motor vehicle, a stand-alone display system, a computer display system, a video camera, a personal digital assistant, a cellular telephone, a television system, a gaming system, and a goggle display system.

7. The display system of claim 5, wherein the plurality of light producing elements includes an array of organic light emitting diodes (OLEDs).

8. The display system of claim 5, wherein the LCD panel is an active matrix LCD (AMLCD).

9. The display system of claim 5, wherein the lens system includes one or more lenses selected from a group that includes a simple lens and a compound lens.

10. The display system of claim 5, further comprising:
a head position sensor; and
a head position sensor interface, communicatively coupled with the head position sensor and the processing subsystem, and adapted to produce head position information based on information describing signals or forces communicated or detected between the head position sensor and the other spatially-separated elements,
wherein the processing subsystem is adapted, based on the head position information, to determine the first set of light producing elements and to determine the second set of light producing elements.

11. The display system of claim 5, further comprising:
an anti-refraction and/or anti-glare layer adapted to deflect light originating from an external environment in order to reduce perceptible glare.

12. An aircraft system comprising:
a processing subsystem adapted to selectively determine a left eye viewing envelope and a right eye viewing envelope, to selectively determine a first set of light emitting diodes and a second set light emitting diodes based on the left eye viewing envelope and the right eye viewing envelope, and to control a backlight and a crystal display (LCD) based on the left eye viewing envelope and the right eye viewing envelope and image information in order to produce three dimensional (3D) images; and
a display device having
a backlight comprising a plurality of light emitting diodes, wherein the backlight is adapted to sequentially alternate between activating the first set of light emitting diodes of the backlight and activating the second set of light of the emitting diodes backlight based on the left eye viewing envelope and the right eye viewing envelope;
a lens system adapted to refract light produced by the first set of light producing elements into the left eye viewing envelope and to refract light produced by the second set of light producing elements into the right eye viewing envelope; and
an LCD panel adapted to selectively pass or block portions of the light produced by the backlight in order to produce left eye image frames in the left eye viewing envelope and right eye image frames in the right eye viewing envelope in a field sequential mode to produce a three dimensional (3D) image.

13. The aircraft system of claim 12, wherein the LCD panel is an active matrix LCD (AMLCD).

14. The aircraft system of claim 12, wherein the lens system includes one or more lenses selected from a group that includes a simple lens and a compound lens.

15. The aircraft system of claim 12, further comprising:
a head position sensor; and
a head position sensor interface, communicatively coupled with the head position sensor and the processing subsystem, and adapted to produce head position information based on information describing signals or forces communicated or detected between the head position sensor and the other spatially-separated elements,
wherein the processing subsystem is adapted, based on the head position information, to determine the first set of light producing elements and to determine the second set of light producing elements.

16. The aircraft system of claim 12, further comprising:
an anti-refraction and/or anti-glare layer adapted to deflect light originating from an external environment in order to reduce perceptible glare.

17. The aircraft system of claim 12, further comprising:
one or more image sensors adapted to produce the image information in the form of sensed image data.

18. The aircraft system of claim 12, wherein the display device is a device selected from a group of devices that includes a primary flight display device, a multi-function display device, an auxiliary display device, a head-up display device, and a near-to-eye display device.

* * * * *